US005757563A

United States Patent [19]

Huang

[11] Patent Number: 5,757,563
[45] Date of Patent: May 26, 1998

[54] MULTI-ANGLE LASER BEAM PROJECTOR

[75] Inventor: Chaochi Huang, Taipei Hsien, Taiwan

[73] Assignee: Quarton Inc., Taipei, Taiwan

[21] Appl. No.: 364,816

[22] Filed: Dec. 27, 1994

[51] Int. Cl.$^6$ ............................................. G02B 5/08
[52] U.S. Cl. ............................ 359/856; 359/857; 354/219
[58] Field of Search ................................. 359/850, 856, 359/857, 858, 859, 431; 354/219, 220, 221, 222, 223, 224, 225

[56] References Cited

U.S. PATENT DOCUMENTS

| | | | |
|---|---|---|---|
| 3,684,380 | 8/1972 | Benchley, Jr. | 359/856 |
| 4,707,604 | 11/1987 | Guscott | 359/858 |
| 4,887,893 | 12/1989 | Dahlgren | 359/857 |
| 5,293,535 | 3/1994 | Sensui | 354/410 |

*Primary Examiner*—Timothy P. Callahan
*Assistant Examiner*—Jung Ho Kim
*Attorney, Agent, or Firm*—Bo-In Lin

[57] ABSTRACT

A multi-angle laser beam projector including a metal base block having a first tapered through hole and a second tapered through hole intersected with the first tapered through hole, the first tapered through hole having one end terminating in a laser beam inlet and an opposite end terminating in a first reflecting hole, the inner diameter of the first tapered through hole being made gradually bigger from the laser beam inlet toward the first reflecting hole, the second tapered through hole having one end terminating in a second reflecting hole and an opposite end terminating in a laser beam outlet, the inner diameter of the second tapered through hole being made gradually bigger from the second tapered through hole toward the laser beam outlet, a first reflector covered over the first reflecting hole and having a reflecting surface for reflecting light from the laser beam inlet onto the second reflecting hole, and a second reflector covered over the second reflecting hole and having a reflecting surface for reflecting light from the first reflector toward the laser beam outlet.

7 Claims, 6 Drawing Sheets

MULTI-ANGLE LASER BEAM PROJECTOR

BACKGROUND OF THE INVENTION

The present invention relates to laser beam projectors for use in reflection goniometers, and relates more particularly a multi-angle laser beam projector which can be alternatively arranged into various alternate forms to project multiple laser beams at different angles.

FIG. 5 shows a laser beam projector for use in a reflection goniometer. The laser beam projector is a pentagon prism 4 having five reflecting surfaces 41 through 45. When a laser beam R1 is projected onto the first reflecting surface 41, it is reflected by the third reflecting surface 43 onto the fifth reflecting surface 45 and then reflected by the fifth reflecting surface 45 out of the pentagon prism 4 through the second reflecting surface 42. This structure of laser beam projector is complicated and expensive to manufacture. Furthermore, the laser beam projector can only produces a single laser beam for measuring angles.

FIG. 6 shows another structure of laser beam projector. This structure of laser beam project comprises a substantially L-shaped base frame 5, and two reflectors 6 and 7 mounted on the L-shaped base frame 5. The contained angle θ defined between the reflectors 6 and 7 is 45°. When a laser beam R1 is emitted onto the first reflector 6, it is reflected by the first reflector 6 and then reflected by the second reflector 7 to form a reflected laser beam R2. This structure of laser beam projector needs much installation space. Another drawback of this structure of laser beam projector is that the L-shaped base frame 5 tends to be broken or deformed during the use. Another drawback of this structure of laser beam projector is that the first and second reflectors are not replaceable. Still another drawback of this structure of laser beam projector is that the contained angle between the reflectors is difficult to achieve accurately. Still another drawback of this structure of laser beam projector is its narrow application range.

SUMMARY OF THE INVENTION

The present invention has been accomplished to provide a multi-angle laser beam projector which eliminates the aforesaid drawbacks. It is one object of the present invention to provide a multi-angle laser beam projector which is easy to manufacture. It is another object of the present invention to provide a multi-angle laser beam projector which is durable in use. It is still another object of the present invention to provide a multi-angle laser beam projector which can be arranged to produce multiple laser beams at different angles. It is still another object of the present invention to provide a multi-angle laser beam projector which eliminates the formation of shading. It is still another object of the present invention to provide a multi-angle laser beam projector which is suitable for measuring different angles.

According to one aspect of the present invention, the multi-angle laser beam projector comprises a metal base block having a first tapered through hole and a second tapered through hole intersected with the first tapered through hole, the first tapered through hole having one end terminating in a laser beam inlet and an opposite end terminating in a first reflecting hole, the inner diameter of the first tapered through hole being made gradually bigger from the laser beam inlet toward the first reflecting hole, the second tapered through hole having one end terminating in a second reflecting hole and an opposite end terminating in a laser beam outlet, the inner diameter of the second tapered through hole being made gradually bigger from the second tapered through hole toward the laser beam outlet, a first reflector covered over the first reflecting hole and having a reflecting surface for reflecting light from the laser beam inlet onto the second reflecting hole, and a second reflector covered over the second reflecting hole and having a reflecting surface for reflecting light from the first reflector toward the laser beam outlet.

According to another aspect of the present invention, the metal base block has mounting slots for mounting the first and second reflectors, and therefore the first and second reflectors are replaceable.

According to still another aspect of the present invention, the reflecting power of the first and second reflectors are designed according to different requirements.

DETAILED DESCRIPTION OF THE PREFERRED EMBODIMENTS

Figure 1:
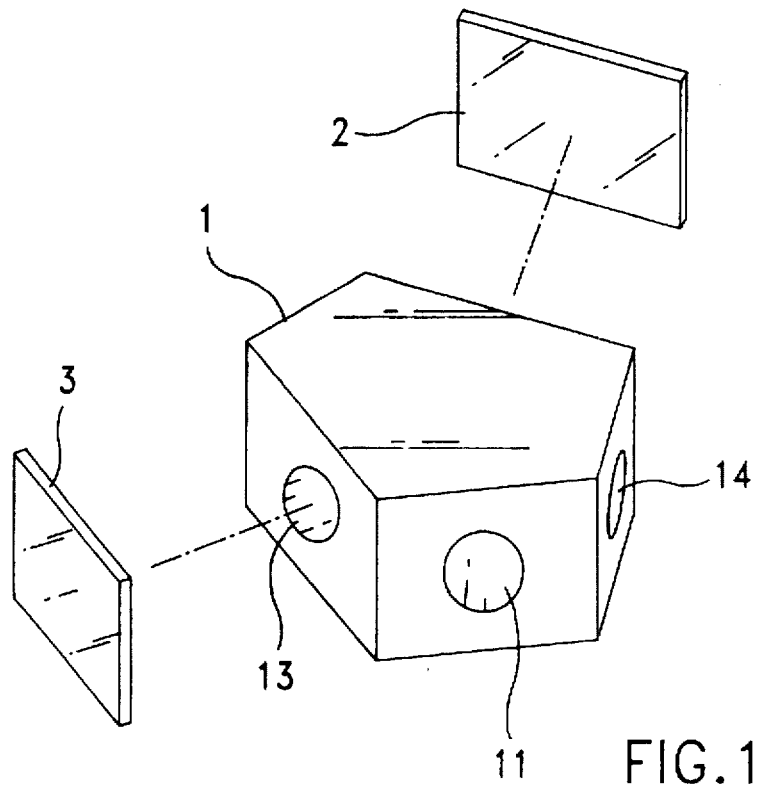
FIG. 1 is an exploded view of a multi-angle laser beam projector according to one embodiment of the present invention.

Referring to FIG. 1, a multi-angle laser beam projector in accordance with one embodiment of the present invention is generally comprised of a base block 1 made from a thick metal plate through a cutting process, a first reflector 2, and a second reflector 3. The base block 1 comprises a laser beam inlet 11, a first reflecting hole 12, a second reflecting hole 13, and a laser beam outlet 14. The laser beam inlet and outlet 11 and 14 and the first and second reflecting holes 12 and 13 are communicated with one another. The inner diameter D1 of the laser beam inlet 11 is smaller than the inner diameter D2 of the first reflecting hole 12. The inner diameter D3 of the second reflecting hole 13 is smaller than the inner diameter D4 of the laser beam outlet 14. The laser beam inlet 11 and the first reflecting hole 12 are longitudinally aligned and formed into a tapered through hole of diameter made gradually bigger from the laser beam inlet 11 toward the first reflecting hole 12. The second reflecting hole 13 and the laser beam outlet 14 are longitudinally aligned and formed into a tapered through hole of diameter made gradually bigger from the second reflecting hole 12 toward to the laser beam outlet 14. The tapered through hole of the laser beam inlet 11 and the first reflecting hole 12 intersects with the tapered through hole of the second reflecting hole 13 and the laser beam outlet 14. The first reflector 2 and the second reflector 3 are respectively covered on the first and second reflecting holes 12 and 13.

Figure 2:
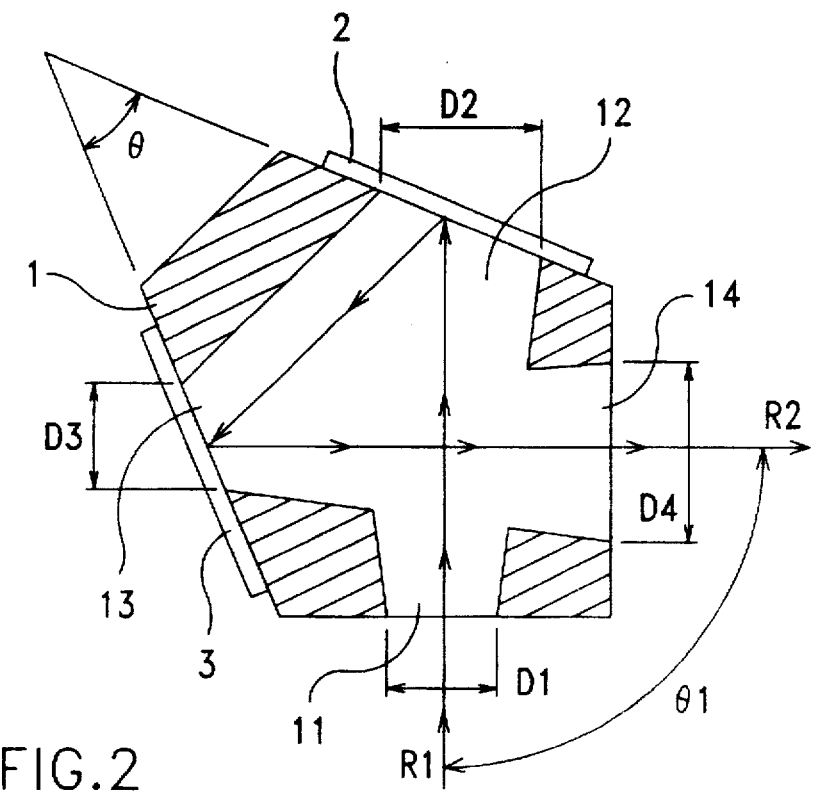
FIG. 2 is a sectional view of the multi-angle laser beam projector of FIG. 1, showing a laser beam driven into the laser beam inlet and reflected out of the laser beam outlet by the first and second reflectors.

Referring to FIG. 2, the contained angle θ defined between the first reflector 2 and the second reflector 3 is 45°. The reflecting power of the reflecting surface of the first reflector 2 as well as that of the second reflector 3 are 100%. Therefore, when an emitted laser beam R1 is projected at the first reflector 2, it can be 100% reflected by the first reflector 2 onto the second reflector 3, and then reflected by the second reflector 3 to form a reflected laser beam R2 through the laser beam outlet 14. The contained angle 61 defined between the emitted laser beam R1 and the reflected laser beam R2 is 90°. Because the inner diameters D1 and D3 of the laser beam inlet 11 and the second reflecting hole 13 are respectively smaller than the inner diameters D2 and D4 of the first reflecting hole 12 and the laser beam outlet 14, and because the tapered through hole of the laser beam inlet 11 and the first reflecting hole 12 as well as the tapered through hole of the second reflecting hole 13 and the laser beam outlet 14 are respectively made gradually bigger toward the moving direction of light, the laser beam can be completely reflected and driven out of the laser beam outlet 14 without causing any shading.

Figure 3A:
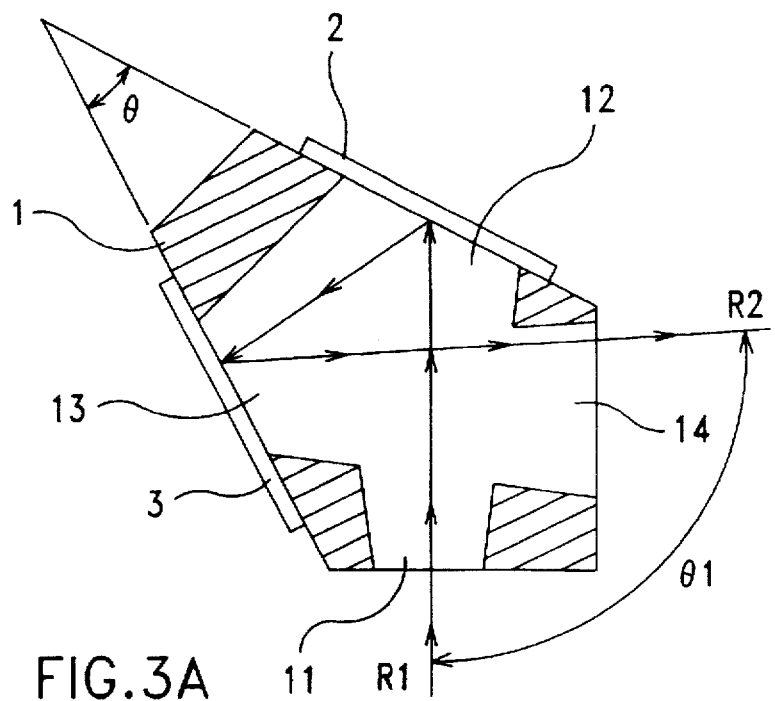
FIG. 3A is similar to FIG. 2 but showing the contained angle between the first and second reflectors changed.
Figure 3B:
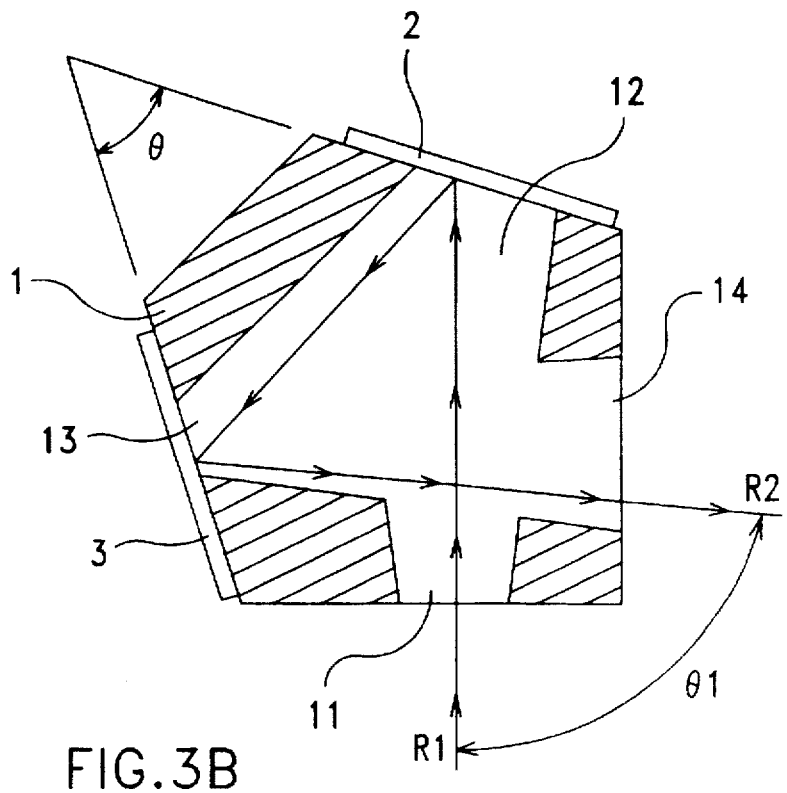
FIG. 3B is similar to FIG. 3A but showing the contained angle between the first and second reflectors changed.

FIGS. 3A and 3B show different contained angles θ defined between the first reflector 2 and the second reflector 3. If the contained angle θ between the first reflector 2 and the second reflector 3 is changed from 45°, the contained angle θ1 defined between the emitted laser beam R1 and the reflected laser beam R2 is changed relatively for measuring angles of not right angle. Because the base block 1 is made from a thick metal plate by cutting,it is easy to process the laser beam inlet and outlet 11 and 14 and the first and second reflecting holes 12 and 13 on the base block 1. Therefore, the actual contained angle θ between the first reflector 2 and the second reflector 3 can be easily accurately made as desired.

Figure 4:
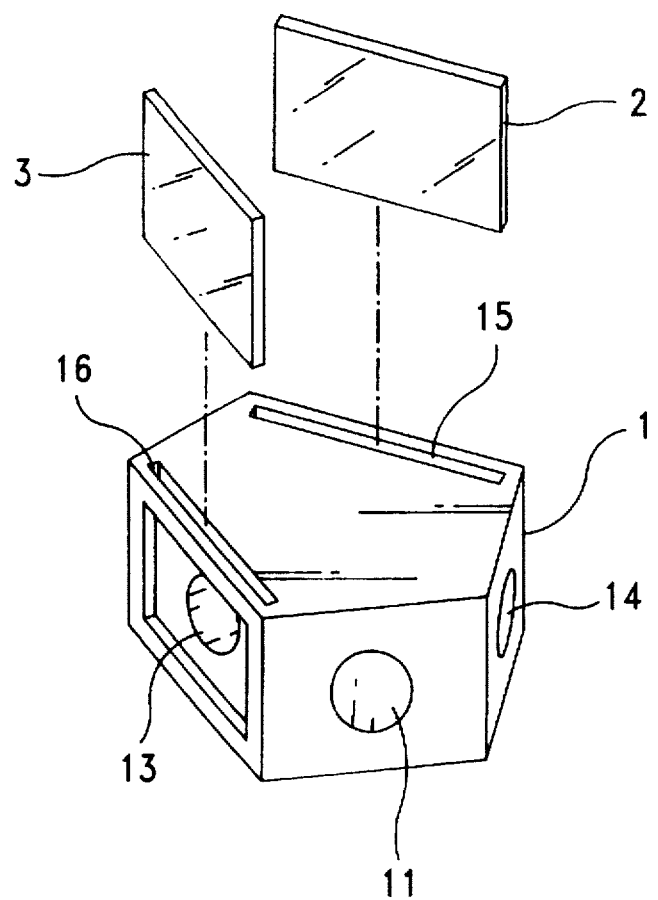
FIG. 4 shows an alternate form of the present invention.

FIG. 4 shows an alternate form of the present invention. As illustrated, mounting slots 15 and 16 are respectively made on the base block 1 at the sides corresponding to the first and second reflecting holes 12 and 13, and therefore the first and second reflectors 2 and 3 can be detachably fastened to the mounting slots 15 and 16 and covered over the first and second reflecting holes 12 and 13. Therefore, the first and second reflectors 2 and 3 are replaceable.

Figure 4A:
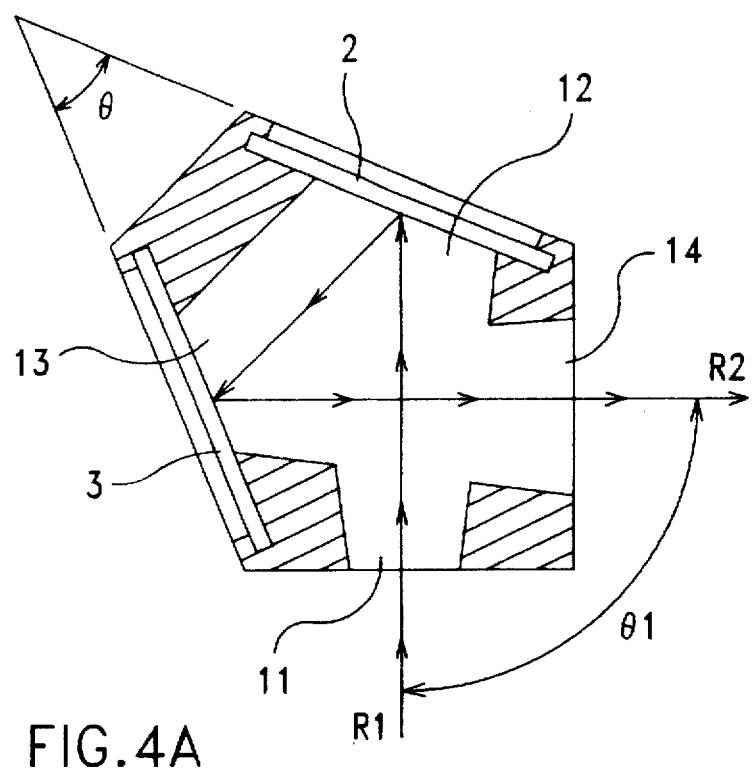
FIG. 4A is an applied view of the alternate form of FIG. 4, showing a reflected laser beam driven out of the laser beam outlet.

Referring to FIG. 4A, the contained angle θ between the first reflector 2 and the second reflector 3 of the alternate form of FIG. 4 is 45°. As the reflecting power of the reflecting surfaces of the first and second reflectors 2 and 3 are 100% and the contained angle θ between the first reflector 2 and the second reflector 3 is 45°, the contained angle θ1 defined between the emitted laser beam R1 and the reflected laser beam R2 is 90° for measuring right angle. If the contained angle e between the first reflector 2 and the second reflector 3 is changed, the contained angle θ1 between the emitted laser beam R1 and the reflected laser beam R2 is relatively changed.

Figure 4B:
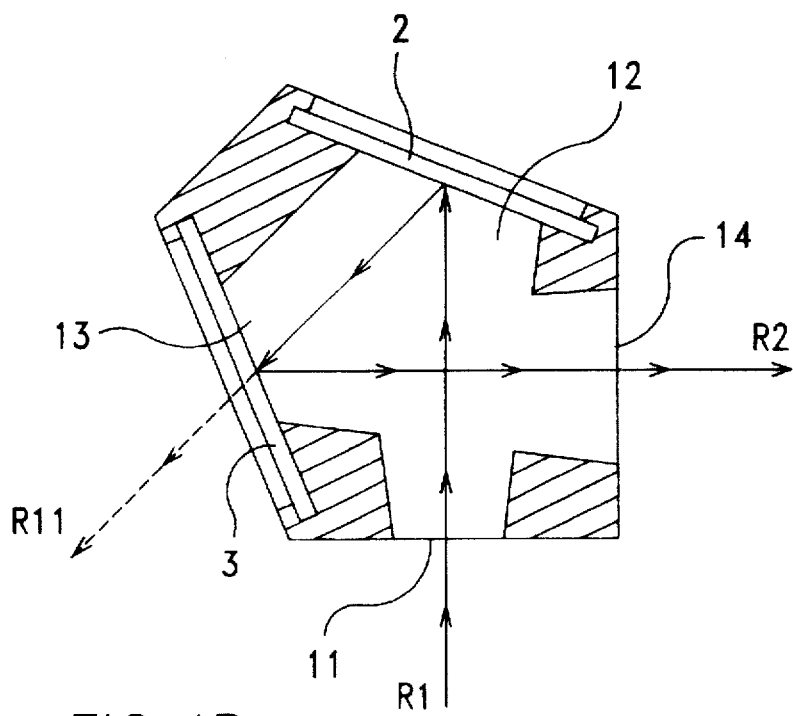
FIG. 4B is an applied view of another alternate arrangement of the present invention, showing two reflected laser beams passing through the second reflector and the laser beam outlet respectively.
Figure 4C:
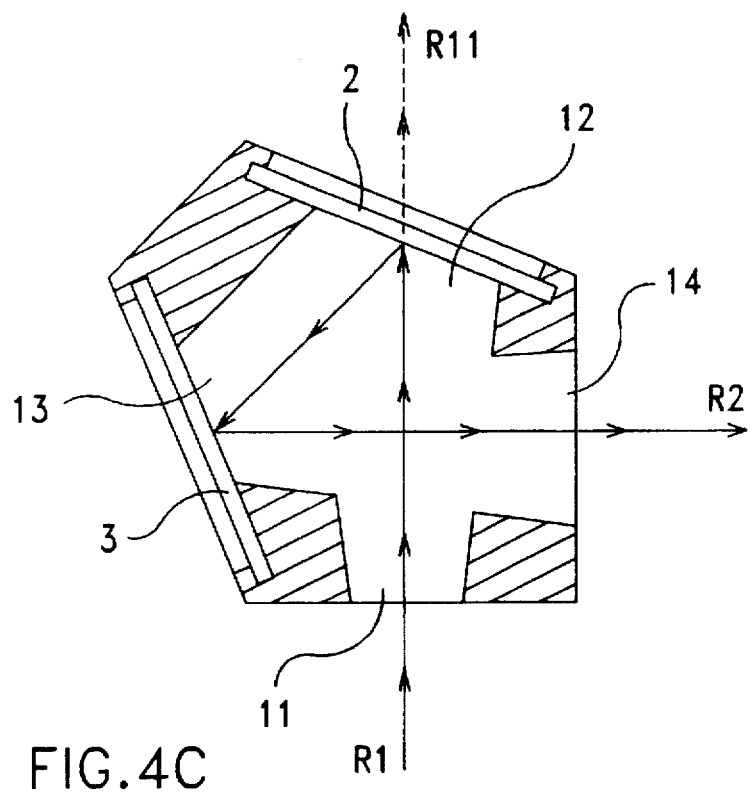
FIG. 4C is an applied view of still another alternate form of the present invention, showing two laser beams passing through the first reflector and the laser beam outlet respectively.
Figure 4D:
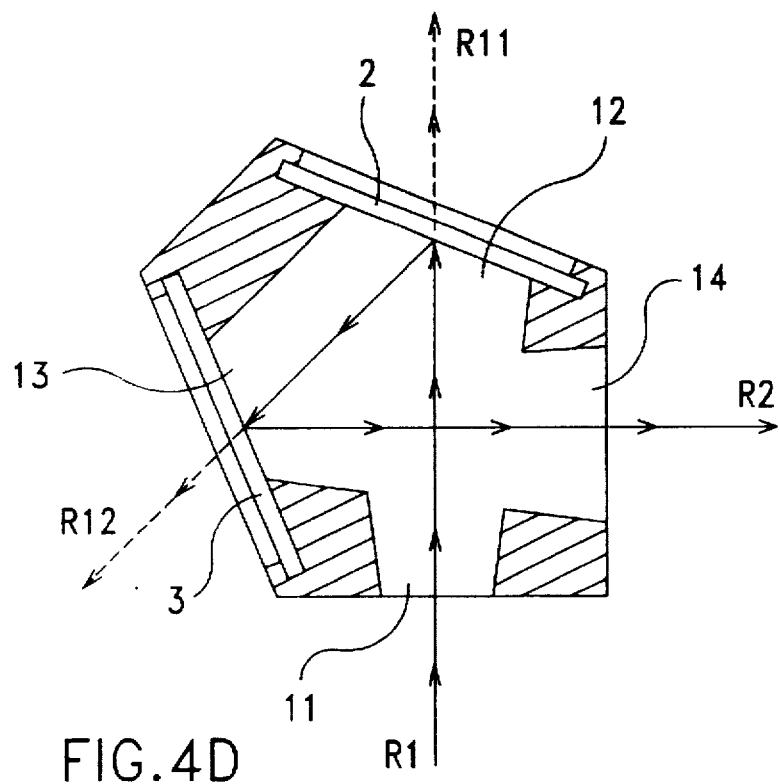
FIG. 4D is an applied view of a yet further alternate form of the present invention, showing three laser beams passing through the first and second reflectors and the laser beam outlet respectively.
Figure 5:
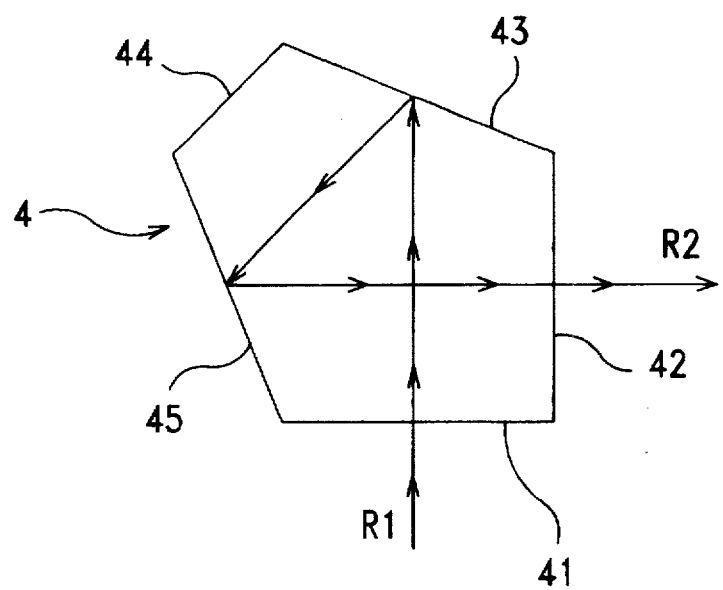
FIG. 5 shows the operation of a laser beam projector according to the prior art.
Figure 6:
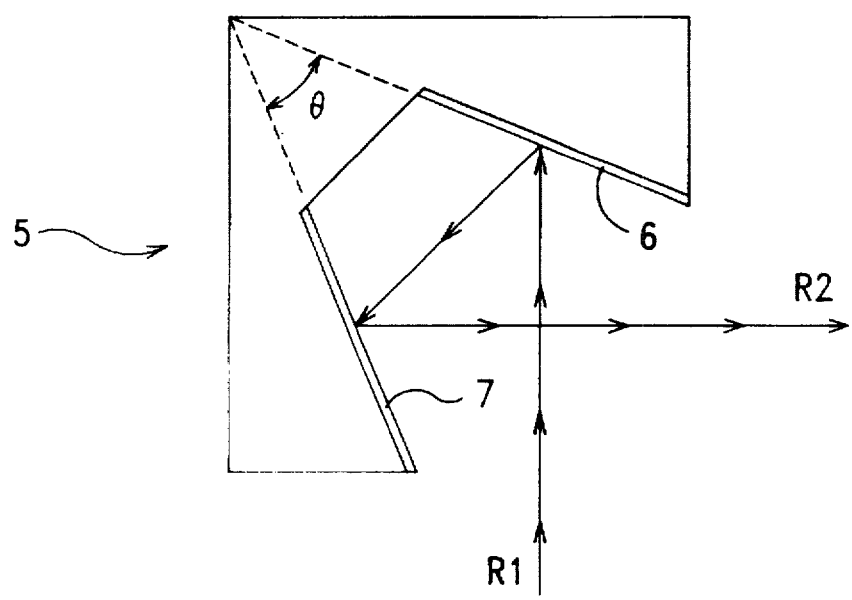
FIG. 6 shows the operation of another structure of laser beam projector according to the prior art.

Because the first and second reflectors 2 and 3 of the embodiment shown in FIG. 4 are replaceable, reflectors of different reflecting power can be alternatively used. FIG. 4B shows an alternate arrangement of the present invention in which the reflecting power of the reflecting surface of the first reflector 2 is 100% and the reflecting power of the reflecting surface of the second reflector 3, therefore the emitted laser beam R1 is 100% reflected by the first reflector 2 upon the second reflector 3, 50% of the laser beam is reflected by the first reflector 2 into a reflected laser beam R11 passing through the second reflector, and the other 50% of the laser beam is reflected by the second reflector 2 and formed into a reflected laser beam R2 and driven out of the laser beam outlet 14. FIG. 4C shows another alternate arrangement of the present invention in which the reflecting power of the reflecting surface of the first reflector 2 is 50% and the reflecting power of the reflecting surface of the second reflector 3 is 100%, therefore 50% of the emitted laser beam R1, namely, the laser beam R11 passes through the first reflector 2, and the other 50% of the emitted laser beam R1 is reflected by the first reflector 2 upon the second reflector 3 and then fully reflected by the second reflector 3 and formed into a reflected laser beam R2 and driven out of the laser beam outlet 14. FIG. 4D shows still another alternate arrangement of the present invention in which the reflecting power of the reflecting surfaces of the first and second reflectors 2 and 3 are 100%, therefore 50% of the emitted laser beam R1, namely, the laser beam R11 passes through the first reflector 2, and the other 50% of the emitted laser beam R1 is reflected by the first reflector 2 upon the second reflector 3 and formed into two equally divided reflected laser beams R12 and R2. The reflected laser beam R12 passes through the second reflector 3. The reflected laser beam R2 passes out of the laser beam outlet 14. Therefore, the base block 1 of the embodiment shown in FIG. 4D produces three laser beams R11, R12, and R2.

While only few embodiments of the present invention have been shown and described, it will be understood that various modifications and changes could be made without departing from the spirit and scope of the invention.

What is claimed is:

1. A multi-angle laser beam projector comprising a base block having a first tapered through hole and a second tapered through hole intersected with said first tapered through hole, said first tapered through hole having one end terminating in a laser beam inlet and an opposite end terminating in a first reflecting hole, the inner diameter of said first tapered through hole being made gradually bigger from said laser beam inlet toward said first reflecting hole, said second tapered through hole having one end terminating in a second reflecting hole and an opposite end terminating in a laser beam outlet, the inner diameter of said second tapered through hole being made gradually bigger from said second tapered through hole toward said laser beam outlet, a first reflector covered over said first reflecting hole and having a reflecting surface for reflecting light from said laser beam inlet onto said second reflecting hole, and a second reflector covered over said second reflecting hole and having a reflecting surface for reflecting light from said first reflector toward said laser beam outlet.

2. The multi-angle laser beam projector of claim 1 wherein said base block comprises a first mounting slot and a second mounting slot, which receive said first and second reflectors respectively.

3. The multi-angle laser beam projector of claim 1 wherein said base block is made from metal.

4. The multi-angle laser beam projector of claim 1 wherein the reflecting power of said first and second reflectors are 100%.

5. The multi-angle laser beam projector of claim 1 wherein the reflecting power of said first reflector is 100%, and the reflecting power of said second reflector is 50%.

6. The multi-angle laser beam projector of claim 1 wherein the reflecting power of said first reflector is 50%, and the reflecting power of said second reflector is 100%.

7. The multi-angle laser beam projector of claim 1 wherein the reflecting power of said first and second reflectors are 50%.

* * * * *